July 27, 1948.  A. MORTLOCK  2,445,800
ELECTRIC FREQUENCY COUNTING ARRANGEMENT
Filed Nov. 10, 1945
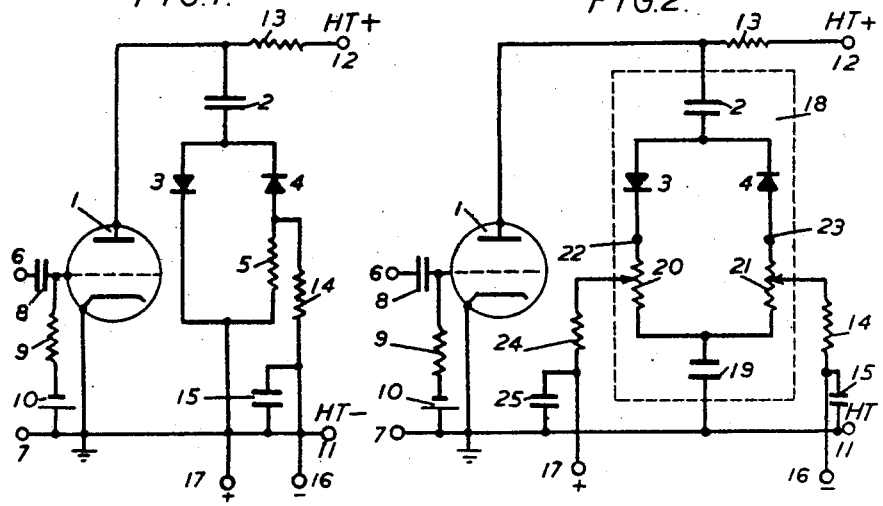
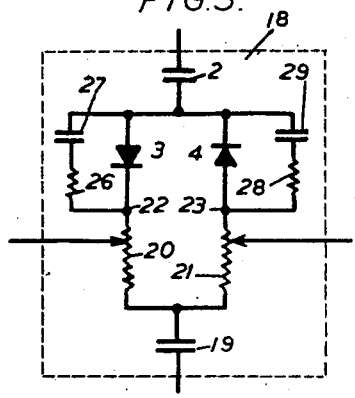
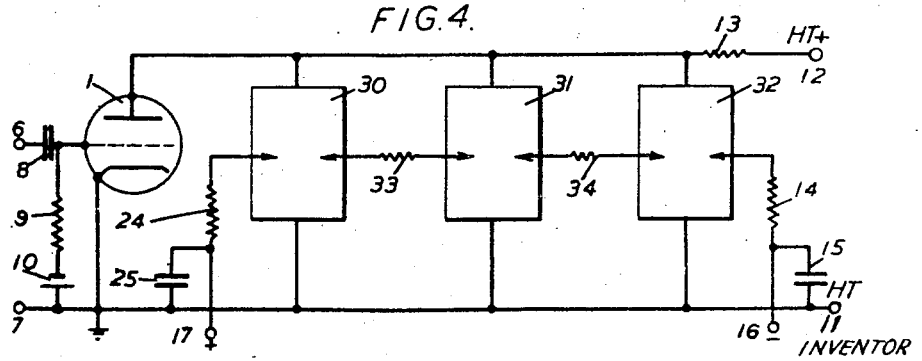
INVENTOR
ALFRED MORTLOCK
BY
ATTORNEY Patented July 27, 1948

2,445,800

UNITED STATES PATENT OFFICE 2,445,800

ELECTRIC FREQUENCY COUNTING ARRANGEMENT

Alfred Mortlock, London, England, assignor to Standard Telephones and Cables Limited, London, England, a British company Application November 10, 1945, Serial No. 627,941
In Great Britain November 28, 1944

8 Claims. (Cl. 320—1)

The present invention relates to electric frequency counting arrangements of the kind in which a current or voltage which varies as a known function of the frequency is derived by the periodic charging and discharging of a condenser at the frequency to be counted or measured.

The principal object of the invention is to increase the sensitivity of the measurements, and another object is to obtain a voltage which varies logarithmically with the frequency.

The invention is of particular though not exclusive application to radio altimeters of the beat frequency type in which the altitude of an aircraft is measured in terms of the frequency difference of waves transmitted from the aircraft and those reflected from the ground.

The several features of the invention are set out as claims 1, 2 and 3 respectively of the statement of claim.

The invention will be described with reference to the accompanying drawing which shows in Fig. 1 a schematic circuit diagram of a known counting arrangement and in Fig. 2 a modification of this known circuit illustrating a feature of the invention. Fig. 3 shows a further modification of the counting network of Fig. 2 to illustrate another feature of the invention. Finally, Fig. 4 shows a circuit diagram of a multiple frequency counting arrangement according to the invention for increasing the sensitivity of the measurement.

The known frequency counting arrangement shown in Fig. 1 comprises a thermionic valve 1 with a counting network connected in series with its anode. The counting network comprises a reservoir condenser 2 connected to the anode, and two oppositely directed rectifiers 3 and 4 connected in parallel between the condenser 2 and ground. A resistance 5 is connected in series with the rectifier 4.

Waves having the frequency to be measured are applied to the terminals 6 and 7. Terminal 6 is connected to the control grid of the valve 1 through a blocking condenser 8. A grid leak resistance 9 is provided, and also appropriate means for biassing the control grid, represented by a battery 10. The high tension voltage source is intended to be connected to terminals 11 and 12. A positive terminal 12 is connected to the anode of the valve through a load resistance 13, and the negative terminal 11 is grounded.

According to the usual practice, the waves applied to the terminals 6 and 7 are arranged alternately to block and unblock the valve so that during the blocking periods the condenser 2 charges through the rectifier 3 and during the unblocking periods it discharges through the valve 1, rectifier 4, and resistance 5. Thus a unidirectional potential difference is generated across the resistance 5, the upper terminal of which is negative, and is smoothed by means of the resistance 14 and condenser 15. This potential difference may be obtained from the terminals 16 and 17, and provided that the condenser 2 is substantially completely charged and discharged in alternate periods, this potential difference will be proportional to the frequency. A voltmeter or like device (not shown) connected to the terminals 16 and 17 could for example be used to indicate the frequency. Clearly if both the rectifiers 3 and 4 be reversed, the sign of the voltage at terminals 16 and 17 will be also reversed.

Fig. 2 shows a modification of the counting network according to the invention. Elements of this figure which are the same as corresponding elements in Fig. 1 are similarly designated and will not again be described in detail. The counting network in enclosed in the dotted outline 18 and differs from the counting network of Fig. 1 in that a resistance is connected in series with each of the rectifiers so as to form a complete bridge network, and the lower corner of the bridge is isolated from earth by a condenser 19. The two resistances in series with the rectifiers 3 and 4 are designated 20 and 21.

The advantage of this arrangement is that other things being equal, it is possible to obtain from the diagonal points 22 and 23 a voltage proportional to the frequency which is approximately double the voltage obtainable from Fig. 1. The introduction of the isolating condenser 19 makes this possible. For convenience in adjusting the output voltage, either or both of the resistances 20 and 21 may be provided with tapping points connected respectively to the output terminals 16 and 17 as shown. A resistance 24 and condenser 25 are included for smoothing purposes between the resistance 20 and the terminal 17, to correspond with the elements 14 and 15 associated with terminal 16.

It will be understood that the condenser 19 acts to modify the capacity of the reservoir condenser 2, and the reservoir condenser can thus be regarded as having been divided into two parts with the bridge network between them. If, however, the condenser 19 is of large capacity compared with that of the condenser 2, it will be acting merely as a blocking condenser and its effect on the effective capacity of the reservoir condenser can be neglected.

The known arrangement of Fig. 1 and the arrangement according to the invention shown in Fig. 2 both produce a unidirectional output voltage proportional to the frequency of the waves applied to terminals 6 and 7. It may, however, be required that the output voltage should vary with frequency according to some other relation. In particular, there are cases in which a logarithmic variation is required. This may be substantially obtained over a certain range of frequencies by modifying the counting network shown in the outline 18 in Fig. 2 in the manner indicated in Fig. 3, the rest of the circuit being as shown in Fig. 2. The rectifiers 3 and 4 are now each shunted by a resistance connected in series with a condenser, these additional elements being designated 26, 27 and 28, 29. By suitable choice of the values of these elements the voltage at the terminals 16 and 17 of Fig. 2 may be caused to vary proportionally to the logarithm of the frequency over a certain range.

In a particular case of Fig. 3, the rectifiers 3 and 4 were dry contact rectifiers having forward and reverse resistances of approximately 7,000 ohms and 6 megohms, and the remaining elements had the following values:

| | |
|---|---|
| Condenser 2 | 150 micromicrofarads |
| Resistances 20 and 21 | 150,000 ohms |
| Condenser 19 | 0.1 microfarad |
| Resistances 26 and 28 | 150,000 ohms |
| Condensers 27 and 29 | 250 micromicrofarads |
| Resistances 14 and 24 | 470,000 ohms |
| Condensers 15 and 25 | 0.1 microfarad |
| Resistance 13 | 6,000 ohms |

Fig. 2

With the above values the logarithmic relation was obtained with sufficient accuracy over the range of frequency from 300 to 10,000 cycles per second. At higher frequencies the voltage obtained becomes rather lower than corresponds to the logarithmic relation.

By the use of other values for the above elements the logarithmic relation can be obtained over other frequency ranges.

The rectifiers 3 and 4 may be dry contact rectifiers of the copper oxide or selenium type, for example, or they may be diodes or other electronic devices which can be arranged to exhibit unilateral conduction.

If the facility of adjusting the output voltage is not required, the taps on either or both of the resistances 20 and 21 of Fig. 2 may be omitted and the resistances 14 and 24 may then be permanently connected to the points 23 and 22 respectively.

Fig. 4 shows a multiple frequency counting arrangement according to the invention in which the unidirectional output voltage which is a function of the frequency may be multiplied several times. The circuit is the same as Fig. 2 except that three counting networks, all of which are similar to the network 18 shown in Fig. 2 or 3, are connected in parallel between the anode of the valve 1 and earth. These three networks are designated 30, 31 and 32, and the tapping points on the resistances 21 and 20 respectively of adjacent counting networks are connected in series through resistances 33 and 34 as indicated. By this means the voltage obtained at terminals 16 and 17 will be equal to the sum of the voltages obtained in each of the counting networks. It will be evident that two, or any other number of counting networks may be similarly connected in parallel to the anode of the valve 1, and in series by means of resistances like 33 and 34, so that any desired multiple of the output voltage of a single network may be obtained.

It will be seen that with a counting network of the known type shown in Fig. 1, such a multiple arrangement could not be possible, since one terminal of the output voltage is grounded.

The valve 1 illustrated in Figs. 1, 2 and 4 acts in these circuits as a periodically operated switch controlled by the waves whose frequency is to be counted, which charges and discharges the reservoir condenser from the high tension source. Any other suitable type of switch could be used instead of the valve. For example, at very low frequencies, a simple electromagnetic relay would do.

It is to be noted also that while a single isolating condenser 19 has been shown, the same result could be obtained in other ways, for example by connecting each of the resistances 20 and 21 to terminal 11 through a separate isolating condenser, or a T or $\pi$ network of isolating condensers could be used.

What is claimed is:

1. An electric frequency counting arrangement comprising a condenser, a Wheatstone bridge network containing a rectifier in each of two adjacent arms and a resistance in each of the other arms, means for connecting the said condenser in series with one pair of diagonal corners of the bridge and in series with one or more other condensers to one terminal of a direct current source, a switch for periodically charging the said condensers from the said source through one of the said rectifiers and to discharge them through the other, the said switch being controlled by waves having the frequency to be counted, and means for deriving a unidirectional voltage from the other pair of diagonal corners of the bridge.

2. An electric frequency counting arrangement comprising a reservoir condenser, two parallel paths each containing a rectifier in series with a resistance and connected at one end to the said reservoir condenser, the said rectifiers being oppositely directed in the said paths, means including one or more isolating condensers for connecting the other ends of the said paths to one terminal of a direct current source, switching means adapted periodically to charge the said condenser from the said source through one of the said paths and to discharge it through the other path, means for applying waves having the frequency to be counted to operate the said switch, and means for deriving a unidirectional voltage from a pair of tapping points located respectively on the said resistances.

3. An electric frequency counting arrangement comprising a switch adapted to be periodically operated under the control of waves having the frequency to be counted; a direct current source; a plurality of counting networks each of which comprises a Wheatstone bridge made up of two oppositely poled rectifiers constituting one pair of adjacent arms and two resistances constituting the other pair, a first condenser connected to the rectifiers, and a second condenser connecting the common terminal of the resistances to one terminal of the source, the switch being adapted alternately to charge the said first and second condensers in each network through one of the corresponding rectifiers and to discharge them through the other corresponding rectifier, the charging and discharging being simultaneous for all the networks; means for deriving a unidirectional voltage from the resistances in each counting network; and means for combining all of the said voltages for obtaining a voltage equal to their sum.

4. A counting arrangement according to claim 3 in which the said counting networks are arranged in series, with a connecting resistance between each pair of adjacent networks, the said connecting resistance being arranged to connect points located on, or at one end of, each of two bridge resistances, one in each of the said networks.

5. A counting arrangement according to claim 4 in which each rectifier is shunted by a network of impedances so proportioned that the said unidirectional voltage is substantially proportional to the logarithm of the frequency over a specified frequency range.

6. A counting arrangement according to claim 5 in which the network of impedances comprises a condenser connected in series with a resistance.

7. A counting arrangement according to claim 6 comprising means for smoothing the derived unidirectional voltage.

8. A counting arrangement according to claim 7 in which the said rectifiers are of the dry contact type.

ALFRED MORTLOCK.

REFERENCES CITED

The following references are of record in the file of this patent:

UNITED STATES PATENTS

| Number | Name | Date |
| --- | --- | --- |
| 2,346,093 | Tolson | Apr. 4, 1944 |